United States Patent [19]
Carrasse

[11] 3,749,026
[45] July 31, 1973

[54] VEHICLE PROPULSION SYSTEM
[75] Inventor: Jean Carrasse, Antony, France
[73] Assignee: Societe Generale De Constructions Electriques Et Mecaniques (Alsthom), Paris, France
[22] Filed: Nov. 18, 1970
[21] Appl. No.: 90,643

[52] U.S. Cl. .................................. 104/156, 104/161
[51] Int. Cl. ............................................. B61b 13/10
[58] Field of Search .................... 104/155, 156, 161, 104/23 FS

[56] References Cited
UNITED STATES PATENTS

| 393,701 | 11/1888 | Goebel | 104/161 |
| 403,729 | 5/1889 | Bodefeld | 104/161 |
| 3,155,050 | 11/1964 | Hafner | 104/23 FS |
| 376,984 | 1/1888 | Goebel | 104/161 |
| 409,769 | 8/1889 | Bodefeld | 104/161 |
| 489,348 | 1/1893 | Vernon | 104/156 |
| 680,843 | 8/1901 | Comstock | 104/156 |
| 3,233,556 | 2/1966 | McDonald | 104/161 |
| 3,586,141 | 6/1971 | Hennessey | 104/23 FS |
| 3,587,471 | 6/1971 | Schneider | 104/23 FS |

Primary Examiner—Drayton E. Hoffman
Attorney—Flynn & Frishauf

[57] ABSTRACT

To propel a vehicle along a way, a source of highly compressed gas is provided, for example a turbine generator, which is introduced into a gas tight housing, such as a cylinder, extending along the way of the vehicle. The gas is introduced into the cylinder ahead of a reaction piston secured to the vehicle, with slides in the gas tight housing. The gas tight housing is closed off by means of a flexible rubber strip which is deflected by a holding bar interconnecting the vehicle and the piston as the vehicle travels along the way, and the gas tight housing. Preferably, from time to time, closing shields are placed within the gas tight housing, opening just before the vehicle arrives and closing thereafter.

10 Claims, 9 Drawing Figures

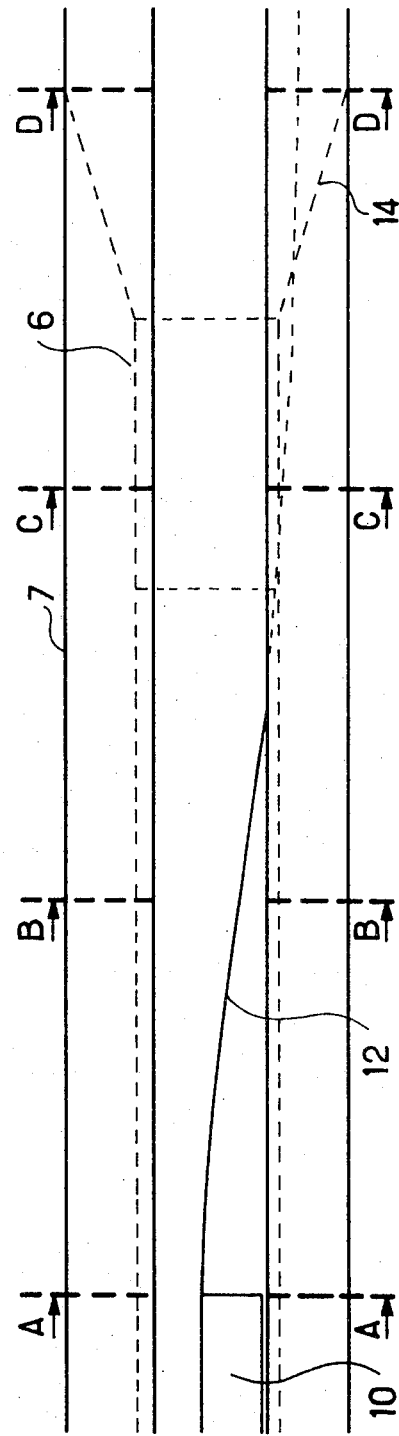
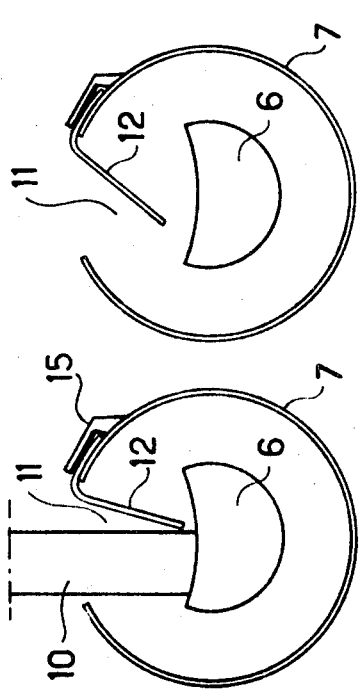
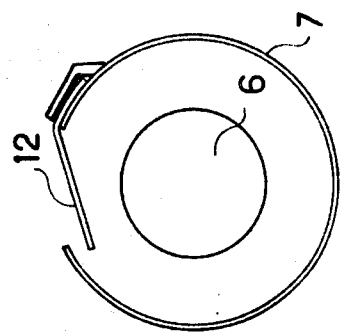
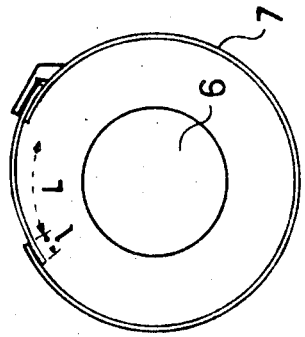

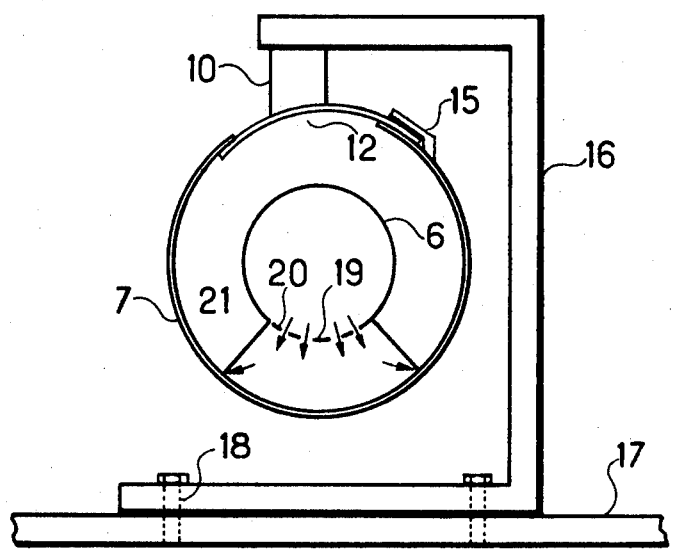

VEHICLE PROPULSION SYSTEM

The present invention relates to a vehicle propulsion system and more particularly to a vehicle propulsion system using gas turbines and providing hot exhaust gases under pessure, the gases acting within a confined space and reacting against a piston secured to the vehicle to propel the vehicle along the way. Under "vehicle" as referred to in the present specification, one may understand either a self contained vehicle, a driving vehicle such as a locomotive, or any kind of carriage, truck body, or other movable body destined to provide transportation for goods and freight of any kind or for people.

Gas turbines have had a rapid development in the last few years, principally for electric energy production, for peaking units, and in the transport field. One of the difficulties inhibiting wider application of gas turbines ism however, the large fuel requirement. Various methods have been proposed to recuperate heat from gas turbines (see for example, French Pat. No. 1,566,631 assigned to the assignee of the present invention).

Propulsion systems using gas turbines have substantial advantages over diesel engines, particularly with respect to the power-weight ratio, and control of change of speed. Yet, just as in the case with diesel engines, the transmission of power from the engine to drive wheels poses problems which result in costly and heavy expenditure of mateials, gears, and the like. The advantages of the light weight of turbo engines are thus to a certain extent lost, particularly if high speeds are a prime object of the design.

It is an object of the present invention to provide a vehicle propulsion system in which mechanical energy derived from gas at high pressure, and produced on board the vehicle by a generator is directly provided in order to avoid speed changing arrangements transmitting power from a gas turbine to the wheels of the vehicle.

SUBJECT MATTER OF THE PRESENT INVENTION

Briefly, a gas tight conduit or tube is provided along the right of way, or track over which the vehicle is to operate. A piston is located in the tight conduit and mechanically connected to the vehicle, the connecting member passing through a slot in the gas tight tubing which is normally closed off by a flexible flap, leaving an opening just big enough for the connecting member to pass therethrough, the opening travelling along the housing as the flap progressively deflects. Gas at high pressure is introduced at the side of the piston opposite the direction of desired motion.

In accordance with the preferred form, the gas generator is a turbo generator having an air compressor, a combustion chamber, and a gas expansion turbine to provide power for the compressor; and a heat exchanger to re-heat the compressed air before being admitted into the combustion chamber, in order to recuperate as much heat as possible from the exhaust gases of the turbine. The heat exchanger is preferably of the type disclosed in Belgian Pat. No. 752,276 (corresponding to copending application Ser. No. 52,650, filed July 6, 1970, now abandoned).

The invention will be described by way of example with reference to the accompanying drawings, wherein:

FIG. 2 is a longitudinal vertical view of the gas tight conduit along the track;

FIGS. 3–6 are transverse cross-sectional views along section lines A—A, B—B, C—C, D—D, respectively of FIG. 2 and illustrating, progressively, the placement of the piston within the conduit and the means to rendering it gas tight;

FIG. 7 is a transverse view of a vehicle propulsion and suspension system;

Figure 1:
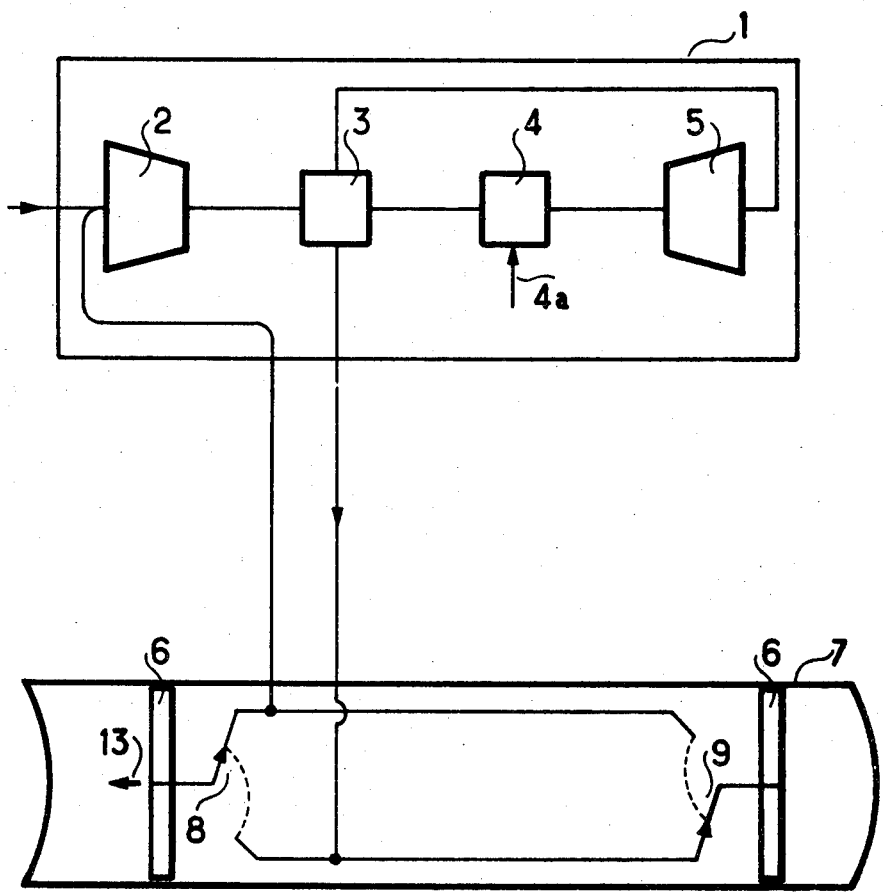
FIG. 1 is a schematic presentation of a propulsion system.

Referring to FIG. 1: A gas turbo generator, generating gas at high pressure is placed on board a vehicle 1. This gas generator includes a compressor 2 which supplies, after preheating in a heat exchanger 3, a combustion chamber 4 having fuel applied thereto over a line 4A, supply a turbine 5, mechanically interconnected with compressor 2 and so dimensioned and designed that it supplies only the necessary power for air compression. The high pressure gas escaping from turbine 5 is guided through the heat exchanger 3 in which a great portion of the heat still contained therein is given off, without however, substantial loss of pressure, to be used directly for the propulsion of the vehicle in accordance with the invention.

The heat exchange system 3 is preferably of the type disclosed in French Pat. No. 1,566,631 (above referred to) or as disclosed in the Belgian Patent. Such a heat exchange device includes ducting interiorly of a housing in which the hot gases under high pressure, from turbine 5, and the air from compressor 2 are alternatively injected in order to from successive slices, or blocs of gas, giving off, or receiving heat from the internal walls through which the gases pass. The internal ducts thus effect a thermal heat exchange by acting as an energy storage device, receiving heat from the gas coming from turbine 5 and giving it off to the air from compressor 2.

The vehicle 1 is connected with a piston, schematically illustrated at 6, and best seen in FIG. 2. The piston can be displaced longitudinally in a gas tight tube 7, located on, or forming the way along which the vehicle should be moved. Gas at high pressure from vehicle 1 is injected into the interior of the gas tight tube 7 at the side of the piston 6 opposite the direction of movement to create a pressure which is increased with respect to that at the other side of the piston 6. A portion of the air for the compressor can be taken off from the air tight tube 7 at the side of the piston opposite the injection side in order to form a partial vacuum and further assist in movement of the vehicle. The opposite sides of the piston are thus subjected to differential pressures and to different forces. The piston is caused to move in the sense of the arrow 13 (FIG. 1) under action of a force which is equal to the difference of the forces acting on its opposed faces. Upon displacement of the piston, the vehicle 1 is carried along thereby by means of an arm member 10 (FIG. 3) and not shown in FIG. 1.

Reversal of direction of movement of the vehicle is easily accomplished. It is only necessary to provide a switch-over valve and remove air from the side of the piston to which it was previously supplied, and supply the compressed air to the other side. Valves 8, 9 (FIG. 1) can effect this switch-over. These valves can likewise be used to provide for braking of the vehicle.

FIG. 2 is a top view of the tight conduit 7 at the moment that a piston passes in the interior thereof. A portion of the piston is shown in broken lines. The arm member 10 (FIGS. 2, 3) interconnects the vehicle and the piston 6. To provide for a gas tight closing of the tube or conduit 7, and still for passage of the piston 6, a longitudinal slit 11 is provided, closed off by a flap 12, for example of reinforced rubber, plastics or the like which can deflect under action of the arm member 10 when a vehicle passes. This action is best seen in connection with FIGS. 3 to 6.

The ends of the piston 6 are flared outwardly, as seen at 14 (FIG. 2) to provide for a close fit of the piston within the conduit 7. This flared end may be a truncated cone. The cone itself assists in closing of the flap against the wall of the conduit, so that the face of the piston 6 beyond the cone 14 will inject (or remove air) from the conduit when in tightly closed condition.

FIG. 3 illustrates the position of flap 12 at the moment of passage of arm 10. Flap 12 is retained on the conduit by means of a clamp 15, or the like, secured to the conduit in a suitable manner, for example by bolts or welding. The locking clamp 15 is so arranged that the flap 12 can deflect to the interior of the conduit 7 to form an opening 11 permitting passage of arm 10 (FIG. 3). To provide for sufficient space for the flap 12, the piston can be deformed from a circle to a half-moon, or crescent shaped form, as best seen in FIG. 3. In the position of FIG. 4, the flap has already begun to close. The arm 10 no longer retains the flap in vertical position but it has started to return against the conduit; the crescent at this point can be less pronounced. FIG. 5, a section along lines C—C of FIG. 2 illustrates the position of the flap, almost closed, the piston being now of round shape. In FIG. 5, a transverse section along lines D—D, the piston 6 is flared out, and flap 12 is completely closed. The end 14 of the piston can be so arranged that it resiliently makes contact with the interior of the walls of conduit 7.

The closing flap 12 preferably has a differential resiliency with respect to its major dimensions. In the longitudinal direction, it is preferably highly resilient, and much more so than in the transverse direction. Rubber which is reinforced with fabric in which the transverse threads or filaments are stiffer than the longitudinal chain filaments is suitable; or, transverse metallic reinforcement may be used. The action of the pressure of the gas itself, from the faces of the piston causes a sealing of the flap surface 1 against the interior of the wall of conduit 7, to provide a tight seal against the edges of the opening 11, without deformation. The flexion under the action of arm 10 will be in the form of a smoothly undulating wave.

Tightness is assured by properly dimensioning the respective distances 1 forming the overlap of the flap 12 with the interior of conduit 7 and the length L which corresponds to the width of the slot 11, covering the opening in conduit 7. For an internal pressure of 2 to 3 bars, and a gap 11 having a width of from about 2-3 cm, an overlap of about 4 cm is suitable. (See FIG. 6 re-6 the width of the gap 11 is shown distorted) The size of the overlap can be substantially reduced by providing on the interior of the wall of conduit 7, adjacent the overlap, and at the matching face of the flap, matching grooves and ridges, or the like to prevent slipping of the flap with respect to the interior surface.

Conduit 7 can be used not only for propulsion, but also for suspension of the vehicle. Referring to FIG. 7, a vehicle having a roof 17 has arm 10 secured thereto by means of a bracket 16 secured to the roof by bolts 18. The arm 16 will carry the gas conduits. The vehicle will be suspended from above by the conduit 7. FIG. 7 illustrates the position in which the flap 12 is closed, that is intermediate sections C—C and D—D of FIG. 2. A portion of the gas from the turbine, rather than being ejected beyond the face of the piston to effect propulsion, is injected below the lower zone 19 of the piston by orifices 20 formed in piston 6 and between a pair of longitudinal vanes 21. The pressure existing in this portion of the conduit due to the escaping gas provides a lifting force to hold the piston in place, and to support the vehicle.

Figure 8:
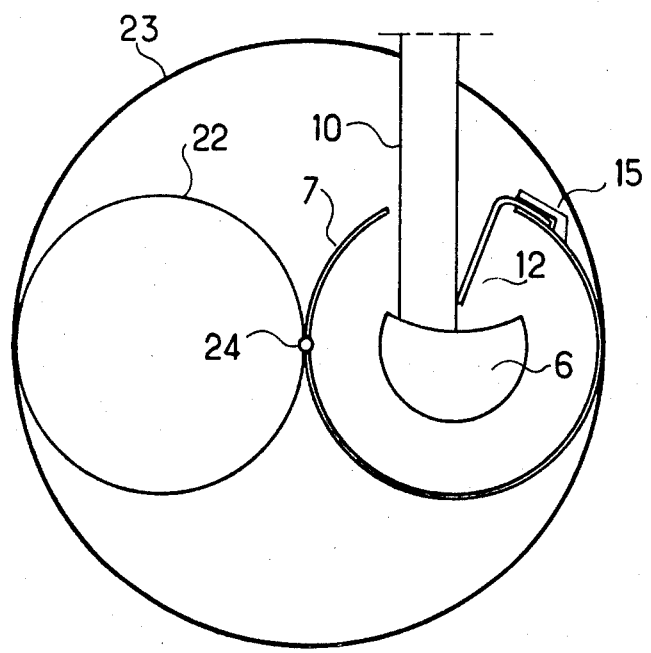
FIG. 8 is a transverse cross-sectional view schematically illustrating an arrangement to close off the gas tight conduit.

To provide for long distance travel, for acceleration, and braking by forming pressure zones behind, or in advance of the piston, as desired, and to decrease the amount of high pressure gas used, it is desirable to divide the gas tight conduit 7 into successive chambers. These divisions can be obtained by screens, shutters, flat valves or the like, to provide for pressure within the conduit from the turbine at all times regardless of the direction of motion of the vehicle. These screens or shutters must, of course, be removed from the way upon passage of the piston. FIG. 8 illustrates a closing flap 22, which is pivotally mounted about an axis 24 in a chamber 23 surrounding the conduit 7. The disk shaped element 22 forms a screen which is removed by a control element mechanically or electrically operated when imminent arrival of the piston of a vehicle is sensed by means, well known in the railway field, by and in itself. Such sensing elements which may be electromagnetic or inductive are well known.

Rather than providing rigid screens, elastic membranes secured to a portion of the conduit may be used, which deflect upon passage of a piston towards the internal wall of the conduit, and then resume the closing position across the conduit after the piston has passed, for example under the gas pressure obtained therefrom.

Figure 9:
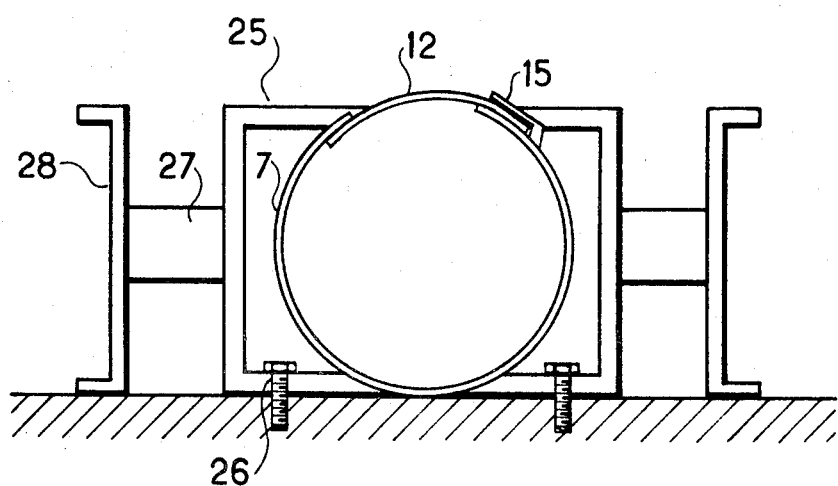
FIG. 9 is a schematic transverse cross-sectional view of a conduit combined with a track layout to guide the vehicle.

FIG. 9 illustrates an arrangement in which the conduit 7 is placed between a track arrangement, supporting the vehicle. It is to be noted that the vehicle wheels are not driven, propulsive power, in accordance with the invention, being derived only from gas pressure acting on the piston faces. The conduit 7 is secured to a metal frame 25, for example by welding, placed on the ground, for example on crossties or the like by means of bolts 26. Cross members 27 connect with tracks 28, for example of C cross section; the internal faces 28 provide guide surfaces for guide wheels of the vehicle, which may have its wheels run where desired.

The propulsion system of the present invention can be used with existing railway or roadway structures, and does not require complicated installations. The conduit itself is simple and can be light, and the system has thus particular applicability for, for example, hybrid types of transport, in which both road and tracked movement is desired.

The high pressure source for the gas may be other than a turbo generator and may consist, for example, of a compressor driven by an electric motor, supplied by any desired power supply.

I claim:

1. Vehicle propulsion system to propel a vehicle along a way comprising means to provide a source of highly compressed gas on board the vehicle;

a gas tight conduit extending the length of the way of travel of the vehicle;

a piston fitting into said conduit;

means mechanically interconnecting the piston and the vehicle;

means located in the interior of the conduit transversely sectionalizing the conduit into successive chambers, said means being removable out of the way of the piston upon approach of the piston;

and means connected to said source of compressed gas conducting and introducing gas into the interior of the conduit at the side of the piston facing rearwardly with respect to the desired vehicle travel or change of speed thereof.

2. System according to claim 1 wherein the source of highly compressed gas comprises a turbine generator including an air compressor, a combustion chamber, a combustion gas expansion turbine connected to said compressor;

and a reheat heat exchanger for the compressed gas located and connected to preheat air before admission to the combustion chamber for recuperation of the heat of the exhaust gases of the turbine.

3. System according to claim 2 wherein the heat exchanger comprises duct means defined by walls forming a heat storage element;

an alternatively operative injection valve means, alternatively injecting hot gas and air, for heat exchange of the hot gases of heat with the walls, and of the thus heated walls with the air in the duct means.

4. System according to claim 1 including means for removing air from the conduit in advance of the piston in the direction of travel of the vehicle, and introducing said so removed air in the high pressure gas generator.

5. System according to claim 1 including gas pressure injection means directed to inject gas under pressure between the piston and the inner side wall of the conduit in a direction radially of the conduit.

6. System according to claim 5 including means to direct the gas injected radially towards the inner wall of the conduit to direct said gases against the lower portion of the conduit to provide a lifting force to the piston, and hence to the vehicle connected thereto.

7. A system according to claim 1 wherein the mechanical interconnection means of the piston and the vehicle comprises an arm member;

said conduit being of circular cross section and formed with a longitudinal opening;

an elastic flap normally closing said opening, said flap being shaped to maintain said circular section of the conduit and being deflectable by said arm to locally deflect, and reclose against the conduit before passage of the face of the piston against which the gas is injected;

said flap comprising a strip of resilient deflectable material secured at one longitudinal edge to the conduit and bearing with the other longitudinal edge against a portion adjacent the opening in the conduit from the inside, so that gas pressure within the conduit will maintain the flap closed and the conduit in air tight condition.

8. System according to claim 7 wherein the resiliently deflectable flap has a flexibility which is greater in the longitudinal direction than in the transverse direction.

9. System according to claim 1, wherein said sectionalizing means comprise disk-shaped elements pivotally mounted about an axis parallel to the axis of said conduit and outside of the inner volume of the latter and sensing means sensing arrival of said piston controlling said elements.

10. System according to claim 1, wherein said sectionalizing means comprise membranes secured to the wall of the conduit, the membranes being elastically deflectable upon passage of said piston towards the internal side of said wall of the conduit.

* * * * *